Dec. 7, 1937. L. C. BRISSON 2,101,425
BRAKING DEVICE FOR ROTATING MACHINE PARTS
Filed Feb. 8, 1936 2 Sheets-Sheet 1

INVENTOR:
LOUIS CHARLES BRISSON
BY Haseltine Lake & Co.
ATTORNEYS

Dec. 7, 1937.  L. C. BRISSON  2,101,425
BRAKING DEVICE FOR ROTATING MACHINE PARTS
Filed Feb. 8, 1936  2 Sheets-Sheet 2

INVENTOR:
LOUIS CHARLES BRISSON
BY Haseltine, Lake & Co.
ATTORNEYS

Patented Dec. 7, 1937

2,101,425

UNITED STATES PATENT OFFICE 2,101,425

BRAKING DEVICE FOR ROTATING MACHINE PARTS

Louis Charles Brisson, Neuilly-sur-Seine, France, assignor to Société Anonyme Société des Freins Hydrauliques S. de Lavaud, Paris, France Application February 8, 1936, Serial No. 62,960
In France August 8, 1935

8 Claims. (Cl. 188—79.5)

This invention relates to means for braking revolving machine parts such as, for example, the wheels of automotive or other vehicles, or of any other variety of machinery. It relates more specifically to improved means of automatically adjusting the slack in such brakes.

The principal object of the invention is to provide means for automatically adjusting the slack in the brake shoes under the conditions of fluctuating temperature obtaining in practical operation, in order to maintain said slack within certain pre-established limits.

A further object of said invention is to provide such slack-adjusting means which will be practically independent of all important temperature changes produced in the brake drum and shoes by the dissipation of energy during the braking period.

A still further object of said invention is to provide such slack-adjusting means which will be both independent of temperature changes in the brake parts and free from the destructive reactions resulting from the partial or imperfect mechanical engagement between driving and driven parts, through the introduction of a "hit-or-miss" device for the purpose of ensuring either the complete engagement or the complete disengagement of the slack-adjusting device.

The following explanations refer specifically to brakes for automotive vehicles, and are given to enable the reader to form a clear idea of the successive technical problems which this invention has solved. However, emphasis is laid on the fact that the invention is by no means limited in its application to automotive vehicles, and that similar problems in all varieties of revolving machinery may be solved by the same means.

Improved means have already been proposed for automatically taking up the excess slack in expansion brakes, as soon as said slack exceeds a pre-established maximum. But the practical application of such improvements has always met with considerable trouble, owing to transient dimensional changes in the brake parts resulting from expansion and contraction under the temperature changes produced by the dissipation of mechanical energy during and after the braking periods. Such expansion momentarily adds to the pre-existing slack, and, during long braking periods, raises the total slack momentarily to values which frequently exceed the pre-established maximum. In such cases, the automatic slack-adjusting mechanism immediately comes into play to reduce said slack and bring it back within the prescribed limits.

However, since the slack-adjusting mechanism is irreversible, the result is that, at the end of long braking periods, as the drum cools off and contracts more rapidly than the internal organs of the brake, it tightens down on the brake shoes, thus frequently blocking the wheels of the vehicle.

The remedy which was next proposed for this inherent defect of the slack-adjusting mechanism consisted in the addition of a thermostat-controlled device for automatically increasing the initial spacing between the brake shoes as fast as the temperature of the brake parts rises, and reducing same when the temperature falls. The radial distance between the brake shoes and the inner surface of the drum may in this way be rendered practically independent of the temperature changes in the brake parts.

This improvement has given satisfaction in practice in certain limited applications. However, it is costly to build, and moreover requires such extreme precision in the setting of the thermostat as to make it impractical for use in the mass-production automotive industries. The proper functioning of the device is dependent on the relative rates of heating and cooling of the brake drum on the one hand, and of the internal organs of brake on the other hand, which rates invariably differ materially, the rate of heat dissipation of the drum being much higher than that of the brake shoes. Hence the best setting for the thermostat is a careful compromise between the two rates, which compromise must be achieved by cut-and-try methods in each individual case.

A simpler substitute for the above-mentioned improvement was then devised, based on the principle of using a thermostatic element to put the slack-adjusting mechanism out of service as soon as the temperature of the brake parts exceeds a given pre-established maximum, with a view to protecting said mechanism from the influence of transient dimensional changes due to heat. In its preferred form described herebelow, it will be seen that the principal operating parts of the slack-adjusting mechanism consist in a combination of a pawl and ratchet. Now according to the last-mentioned improvement, the thermostat is connected directly to the pawl, in such a manner that the latter raises said pawl progressively as the temperature of the brake parts rises. When said temperature reaches the pre-established maximum limit, the pawl ceases to engage the ratchet teeth and the slack-adjusting mechanism becomes inoperative.

The application of this improvement in practice has brought to light a fundamental defect inherent to the progressive movement of the pawl. As the temperature of the brake parts approaches the pre-established maximum, the contact surface between the tip of the pawl and that of the teeth is gradually decreased and approaches zero. If the brake be applied when said contact surface is very small, the mechanical strains become so concentrated that the tips of both the tooth and the pawl are damaged, and the slack-adjusting mechanism is thus rapidly destroyed.

The object of the present invention is to correct this last defect, by interposing between the pawl and the thermostat, or between any other appropriate parts of brake-slack adjustment mechanism, certain mechanical connecting means embodying the hit-or-miss principle. This improvement leaves the pawl free to fully engage the ratchet teeth until the brake parts reach a given temperature. As soon as said temperature is reached, the pawl is then blocked in such a position that all contact between said pawl and said teeth is prevented.

The structural details and operation of the invention will appear to one skilled in the art from the following description and the accompanying drawings, in which:

Fig. 1 indicates, in elevation, a cross-section through the brake, showing the general arrangement of the brake parts;

Figure 1:
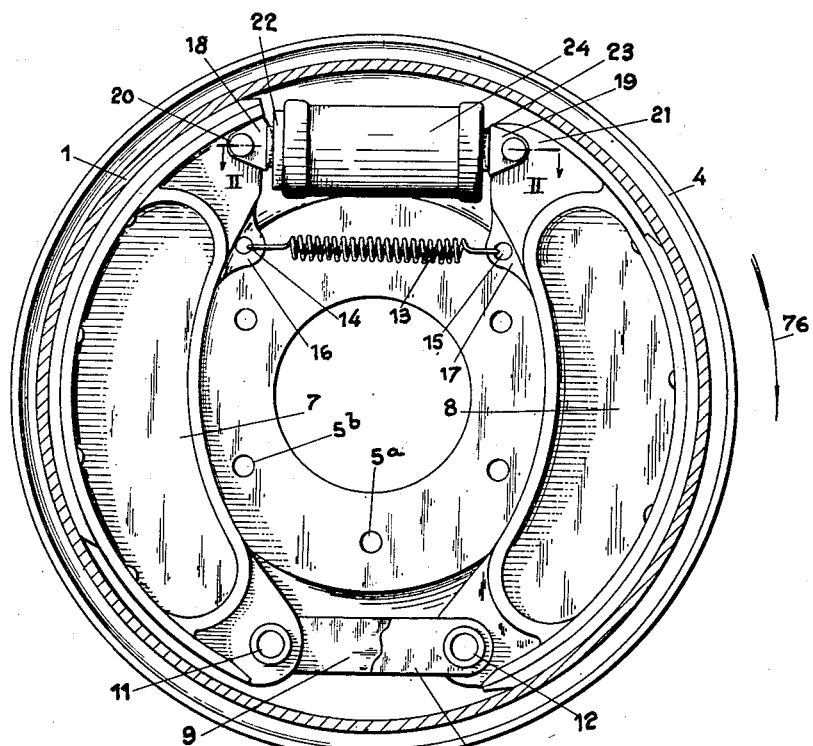
Figure 4:
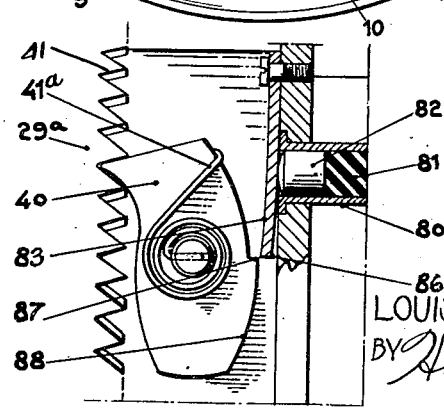
Fig. 4 shows in detail one embodiment of the thermostat-controlled hit-and-miss device for putting the slack-adjusting mechanism out of service, when the temperature of the brake parts rises above a pre-established value.

The brake illustrated in the drawings is of the hydraulically-operated expansion type commonly used on automotive vehicles. However, the invention may be used on any other type of brake comprising a braking surface integral with the revolving machine parts to be braked, braking means to be forcibly applied against said braking surface, and operating means for applying said braking means against said braking surface.

In the embodiment of the invention illustrated in the accompanying drawings, the brake drum 1 is intended to be rigidly fixed to a wheel by any appropriate means which have not been shown. 4 is the fixed cheek member commonly used on motor vehicles, which fulfils the double purpose of serving as support for the brake shoes, the expanding mechanism and other brake parts, and as a cover plate enclosing the drum; for the purpose of preventing mud or other extraneous matter from penetrating among the brake parts. The means of fixation of said cheek member or cover plate have also been omitted for the sake of simplicity, only the bolt holes 5a, 5b etc. being shown.

In the example shown, the braking means consist of two expansible brake shoes 7 and 8 connected together by links 9 and 10, which are respectively pivoted at 11 and 12 to the lower end of brake shoes 7 and 8. At the upper end of said shoes, a helical spring, or its equivalent, 13, attached through holes 14 and 15 to lugs 16 and 17, tends to draw said brake shoes 7 and 8 together. The brake shoes 7 and 8 are each provided with bearing members 18 and 19 of hardened steel or other suitable material, attached to the brake shoes 7 and 8 by any appropriate means, such as, for example, rivets 20 and 21. Through the action of helical spring 13, said bearing members 18 and 19 are maintained in continuous contact with plungers 22 and 23 of the operating mechanism 24. In their relative positions, the working faces of plungers 22 and 23, against which press the bearing members 18 and 19, are plane surfaces, and plungers 22 and 23 are guided along axes perpendicular to said working faces, hence parallel to links 9 and 10. Consequently, all the forces applied to the brake shoes 7 and 8 by the operating mechanism 24, by links 9 and 10 and by the braking torque, are constant in direction and parallel to each other.

Figure 2:
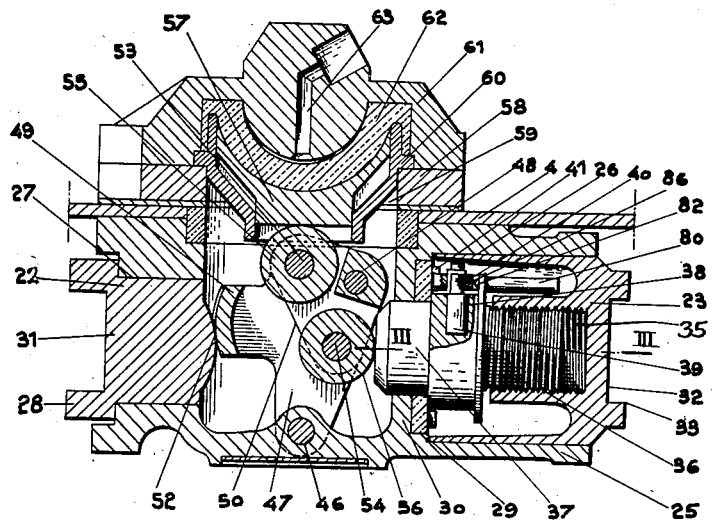
Fig. 2 is a large-scale cross-section through the operating mechanism along line II—II of Fig. 1.

The operating mechanism 24 which is illustrated in detail in Fig. 2, in one of its preferred forms, comprises a cylinder 25 which is rigidly attached to the fixed cheek member or cover plate 4, inside the brake drum 1. Said cylinder 25 is bored cylindrically at 26 and 27 along two parallel axes. Plunger 23 fits slidingly into bore 26, and plunger 22 likewise into bore 27. Plunger 22 is provided with a head 28 of larger diameter, for the purpose of limiting its axial displacement inwards, while plunger 23 is limited in its axial displacement inwards by a collar which strikes against an abutment member 29 integral with an inner partition 30 of cylinder 25. Plungers 22 and 23 are therefore guided co-axially in a fixed direction. Their working faces 31 and 32 are perpendicular to this motion, and the operating cylinder 25 is fixed to the cover plate 4 in such a position as to be parallel to links 9 and 10.

Plunger 23 fulfils an important function in the slack-adjusting mechanism. It constitutes a variable-length spacing member inserted between the operating mechanism and the brake shoes, so that, by varying the length of said spacing member, the slack in the brake shoes may be varied at will.

To this end, plunger 23 is drilled concentrically at 35, said hole being tapped to accommodate the threaded portion 36 of a rotatable spacing plunger 37. On the other hand, the working face of plunger 23 is provided with two projecting parallel ribs 33, leaving between them a slot or keyway into which fits slidingly the bearing member 19 of the brake shoe 8. Hence, plunger 23 is permanently restricted in its motion to straight axial translation, and cannot revolve around its own axis. From the foregoing, it is clear that, by rotating plunger 37, plunger 23, which cannot rotate, will be moved outwards or inwards, and the brake shoes 7 and 8 will thereby be moved correspondingly closer or further from the surface of drum 1.

In order to make such adjustment automatic, it must be tied up with the amplitude of displacement of the brake shoes 7 and 8 during the braking period, in such a manner that, when said amplitude becomes excessive, the length of the spacing member will automatically be increased. In the particular embodiment described, this end is attained by the following means, it being understood, however, that the same result could be reached by other similar means which fall within the scope of this invention.

Figure 3:
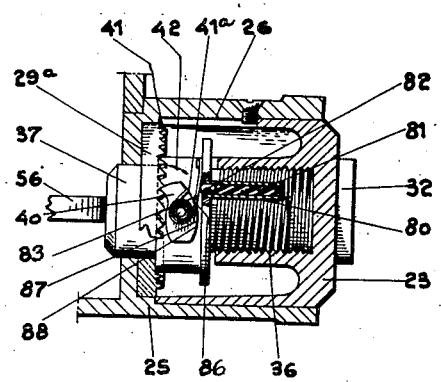
Fig. 3 is a fragmentary plane cross-section along line III—III of Fig. 2.

Plunger 37 is drilled radially at 38 to accommodate the pivot pin 39 of a pawl 40. Said pawl 40 co-operates with ratchet teeth 41 cut in the abutment member 29ª set in partition wall 30. Said abutment member 29 is pressed into place in a recess in partition 30, so that it is unable to revolve. A spring 41a tends to force pawl 40 to revolve in the direction of the arrow 42. It is clear from Fig. 3 that, when the brake is applied, plungers 23 and 37 move forward together, entraining pawl 40. Under the pressure of spring 41a, the tip of pawl 40 travels down along the rear face of the ratchet tooth 41 with which it happens to be in contact. If the amplitude of motion of the brake shoes is less than the radial height of the ratchet tooth, pawl 40 will remain in contact with the rear face of said tooth, and, when the brake is next released, and the brake shoe together with pawl 40 return to their initial position, the tip of pawl 40 merely travels back along the rear face of tooth 41, and no change takes place in the angular relation of plungers 23 and 37. On the contrary, if the amplitude of motion of the brake shoe exceeds the radial height of the ratchet tooth, the tip of pawl 40 slips off the tip of tooth 41 and engages the working face of that tooth, so that, when the brake is next released and pawl 40 moves back to its initial position, it will force plunger 37 to rotate with respect to plunger 23, and so lengthen the overall dimension of the spacing member, thus taking up the excess slack.

The above-described mechanism constitutes an automatic slack-adjusting device which has already been disclosed in certain previous work of the applicant. It is evident, however, that the spacing member 23—37 need not necessarily be a distinct and separate element in the mechanism, and might be incorporated with either the brake shoe or the brake operating mechanism, provided it retain its function of affording the means of moving the brake shoe, in its initial position when the brake is at rest, further from the center and nearer to the drum, thereby reducing the slack.

In the interior of cylinder 25 is pivoted at 46 a lever 47 which carries at 48 a pin upon which is pivoted a bent lever 50. Lever 47 also comprises a rounded projecting abutment member 49 which contacts with the inner face of plunger 22 at 52. Lever 50 carries at 53 and 54 pivot pins for rollers 55 and 56, roller 56 bearing on the inner face of plunger 37, while roller 55 bears on a plunger 57 which will be described hereinbelow.

The above-described operating device is also known from previous disclosures.

Outside the fixed cheek member or cover plate 4 is fixed a support 58 which is bored at 59 to accommodate a sleeve member 60. A cup-shaped cap 61 fits over support 58 and sleeve member 60 with sufficient clearance to firmly clamp the edge of a thick hemispherical rubber diaphragm 62. Cap 61 is perforated at 63 to accommodate certain fittings for the purpose of applying hydraulic pressure from any appropriate source which need not be described herein. The use of an extensible rubber diaphragm such as 62 is also already known. Under the action of the hydraulic pressure, said diaphragm is distended and displaces plunger 57 inwards against roller 55.

The operation of this device is as follows:

Let it be supposed that the brake drum rotates in a clockwise direction, as shown by arrow 76, Fig. 1, and that hydraulic pressure is applied through orifice 63, thus distending diaphragm 62 and displacing plunger 57. Said plunger 57 thrusts against roller 55, which tends to revolve lever 50 around pivot pin 48.

The angular displacement of said lever 50 can produce two separate actions. Let us suppose that plunger 22 remains stationary, which will be shown below to the correct assumption under the conditions obtaining. Triangle 52—48—46, which has two fixed vertices at 52 and 46, necessarily has its 3rd vertex, 48, also stationary. Lever 47 therefore remains stationary. Point 48 being fixed, the rotation of lever 50 transmits a thrust against plunger 37, which in turn pushes plunger 23, since the screw-thread is irreversible. Plunger 23 then pushes bearing member 19 and brake shoe 8, which last moves outwards and presses against the inner surface of the brake drum. Said brake shoe 8 is entrained by friction by said brake drum 1, and transmits this force through links 9 and 10 to brake shoe 7. Said brake shoe 7 then presses against plunger 22, tending to push same inside cylinder 25. This motion is prevented by the head 28, so that the combined effect of the reaction of plunger 22 against brake shoe 7 and of the thrust of links 9 and 10 is to intensify the pressure of said brake shoe 7 against the inner face of the drum. This effect is the well-known action of the self-applying friction brake, and need not be further described herein.

When the brake drum revolves in the opposite direction, plunger 23 becomes stationary. Therefore pivot pin 24 is also stationary, and the pressure of plunger 57 on roller 55 forces piston 22 outwards. If the brake is on an automotive vehicle, this condition obtains when the vehicle is moving backwards. The operation of the brake is identical to the preceding case, with the exception that plunger 22 is now the expanding agent, and that, in this case, the slack-adjusting mechanism is inoperative.

It is clear from the above description of the operation of the slack-adjusting mechanism that the latter will function in exactly the same manner, whether the excess slack be due to wear or to heat expansion. It is therefore evident that, in the latter case, the subsequent contraction of the drum on cooling will meet the brake shoes in a partially expanded condition, and that the brake will jam.

According to the present invention, this defect is corrected by the use of a thermostatic element. In one of the preferred forms of the invention, the thermostat consists of a tube 80 containing an expansive substance 81, such as vulcanized rubber, which, under the influence of heat, forces a plunger 82 outwards against the resistance of a flat spring or catch member 83. Said catch member 83 is gradually deflected by the thermostat as the temperature of the brake parts rises, and when the pre-established maximum temperature is reached the tip 86 of spring 83 comes in contact with the top surface of pawl 40.

If this contact occurs between braking periods, that is, when the brake is not applied, the tip 86 of catch member 83 engages a notch or stop 87 formed in the top surface of pawl 40. It is clear that, when the brake is next applied and pawl 40 follows the motion of the brake shoe, said pawl will remain lifted, in spite of the pressure of spring 41a, and the slack-adjusting mechanism will remain inoperative. On the other hand, if the contact between strip 83 and pawl 40 occurs during a braking period, that is when pawl 40 is down, the tip 86 of strip or catch member 83 will press against the rounded portion 88 of the top surface of pawl 40. Then, as soon as the brake is released, and pawl 40 is once more forced down against the ratchet teeth 41, the tip 86 of catch member 83 will slide along the surface 88 until it snaps into stop 87. From that time on, the slack-adjusting mechanism will remain inoperative until the brake parts cool off sufficiently to disengage catch member 83 from stop 87.

In the embodiment described hereabove, the engagement of catch member 83 with stop 87 occurs when the pawl 40 is completely engaged with the ratchet tooth 41, because the pivot pin of said pawl 40 moves, when the brake is applied, in a plane perpendicular to the base plane of the ratchet, and parallel to the working face of the tooth 41 that is in service. Incidentally, this disposition presents material advantages.

It should be borne in mind that the above-described embodiment of the invention represents one solution only of the same, and that many other solutions exist which fall within the scope of the claims.

What I claim as my invention and desire to secure by Letters Patent is:

1. In a braking device for rotating machine parts, in combination, a braking surface integral with said machine parts, braking means for exerting pressure on said braking surface, operating means for applying said braking means against said braking surface, automatic slack-adjusting means for taking up excess slack in said braking means, and automatic hit-or-miss means controlled by the temperature of the brake parts which block said automatic slack-adjusting means in such position as to render same fully inoperative as soon as the temperature of the brake parts reaches a pre-established maximum, and fully release said slack-adjusting means when the temperature drops below said maximum.

2. In a braking device, in combination, a braking surface, braking means for exerting pressure on said surface, operating means for applying said braking means against said braking surface, a variable-length spacing member, inserted between said operating means and said braking means for the purpose of adjusting the slack, automatic means for varying the length of said spacing member as soon as the slack exceeds a given pre-established maximum, and automatic hit-or-miss means controlled by the temperature of the brake parts which block said automatic slack-adjusting means in such position as to render same fully inoperative as soon as the temperature of the brake parts reaches a pre-established maximum, and fully release said slack-adjusting means when the temperature drops below said maximum.

3. In a braking device, in combination, a braking surface, braking means for exerting pressure on said braking surface, operating means for applying said braking means against said braking surface, a variable-length spacing member inserted between said operating means and said braking means for the purpose of adjusting the slack, automatic means operated by the motion of said braking means for varying the length of said spacing member as soon as the slack exceeds a given pre-established maximum, and automatic hit-or-miss means controlled by the temperature of the brake parts which block said automatic slack-adjusting means in such position as to render same fully inoperative as soon as the temperature of the brake parts reaches a given pre-established maximum, and fully release said slack-adjusting means when the temperature drops below said maximum.

4. In a braking device, in combination, a braking surface, braking means for exerting pressure on said surface, operating means for applying said braking means against said braking surface, a variable-length spacing member, inserted between said operating means and said braking means for the purpose of adjusting the slack, automatic means operated by the motion of said braking means for varying the length of said spacing member as soon as the slack exceeds a given pre-established maximum, a thermostat controlled by the temperature of the brake parts, and hit-or-miss means controlled by said thermostat which block said automatic slack-adjusting means in such position as to render same fully inoperative as soon as the temperature of the brake parts reaches a given pre-established maximum, and fully release said slack-adjusting means when the temperature drops below said maximum.

5. In a braking device, in combination, a drum, articulated friction brake shoes inside said drum, an elastic member tending to draw said brake shoes together, means for expanding said brake shoes against the action of said elastic member and applying same against the drum, between said expanding means and said brake shoes, a variable-length spacing member, in said spacing member, a rotatable threaded member, a pawl rotatably supported on said threaded member, an elastic member tending to rotate said pawl, a plurality of ratchet teeth so disposed as to be engaged by said pawl under the action of said elastic member, a thermostat controlled by the temperature of the brake parts, a movable hit-or-miss catch member operated by said thermostat and a stop on said pawl co-acting with said movable catch member to block said pawl and prevent any rotation of the same as soon as the temperature of the brake parts reaches a given pre-established maximum, and to fully release said pawl when the temperature of the brake parts drops below said maximum.

6. In a braking device, in combination, a drum, articulated friction brake shoes inside said drum, an elastic member tending to draw said brake shoes together, means for expanding said brake shoes against the action of said elastic member and applying same against said drum, between said expanding means and said brake shoes a variable-length spacing member, in said spacing member a rotatable threaded member, a plurality of ratchet teeth integral with said threaded member, a pawl rotatably mounted on a stationary pivot pin and co-acting with said ratchet teeth, a thermostat controlled by the temperature of the brake parts, a movable hit-or-miss catch member operated by said thermostat and a stop on said pawl co-acting with said movable catch member to block said pawl and prevent any rotation of the same as soon as the temperature of the brake parts reaches a given pre-established maximum, and fully releases said pawl as soon as the temperature drops below said maximum.

7. In a brake, a drum, friction means for engaging the drum, means for expanding said friction means, and comprising a movement transmitting member, a receiving member, and a connecting member between the transmitting member and the receiving member, means providing pivotal connection of said connecting member to at least one of the two other members, and whereby the rotation of the connecting member modifies the spacing between the transmitting member and the receiving member, a ratchet connection comprising two parts, the first part being a ratchet wheel and the second part being a spring pressed pawl engaging said ratchet wheel and having a stop, means for making one of the said two parts stationary, means for connecting the other of said two parts to the connecting member, a thermostat controlled by the temperature of the brake parts, a movable hit-or-miss catch member operated by said thermostat and co-acting with the stop of the pawl to block said pawl as soon as the temperature of the brake parts reaches a given pre-established maximum, and to fully release said pawl when the temperature of the brake parts drops below said maximum.

8. In a brake, a drum, friction means for engaging the drum, means for expanding said friction means, and comprising a movement transmitting member, a receiving member, and a connecting member between the transmitting member and the receiving member, means providing pivotal connection of said connecting member to at least one of the two other members for pivoting about a geometrical axis parallel to the direction of expanding means whereby the rotation of the connecting member modifies the spacing between the transmitting member and the receiving member, a ratchet connection comprising two parts, the first part being a plane disk having ratchet teeth arranged with its geometrical axis coinciding with the first named axis and the second part being a spring pressed pawl engaging one of said teeth and having a stop, means for making one of the said two parts stationary, means for connecting the other of said two parts to the connecting member, a thermostat controlled by the temperature of the brake parts, a movable hit-or-miss catch member operated by said thermostat and co-acting with the stop of the pawl to block said pawl as soon as the temperature of the brake parts reaches a given pre-established maximum, and to fully release said pawl when the temperature of the brake parts drops below said maximum.

LOUIS CHARLES BRISSON.